United States Patent [19]
Marano et al.

[11] Patent Number: 5,712,006
[45] Date of Patent: Jan. 27, 1998

[54] NON-FOIL POLYMER COATED CARTON FOR PACKAGING FOOD AND NON-FOOD PRODUCTS

[75] Inventors: G. A. Marano; Allan A. Whillock; Charles E. Gibbons, all of Mobile, Ala.

[73] Assignee: International Paper Company, Tuxedo Park, N.Y.

[21] Appl. No.: 527,620

[22] Filed: Sep. 13, 1995

[51] Int. Cl.⁶ ............................................. B29D 22/00
[52] U.S. Cl. ............... 428/34.2; 428/475.8; 428/511; 428/513; 428/515; 428/516
[58] Field of Search ................... 428/36.7, 475.8, 428/513, 34.2, 511, 515, 516

[56] References Cited

U.S. PATENT DOCUMENTS

| | | | |
|---|---|---|---|
| 3,972,467 | 8/1976 | Whillock et al. | 229/14 BL |
| 4,138,441 | 2/1979 | Kennedy et al. | 260/666 |
| 4,513,036 | 4/1985 | Thompson et al. | 428/35 |
| 4,661,414 | 4/1987 | Kowalski | 428/461 |
| 4,777,088 | 10/1988 | Thompson et al. | 428/323 |
| 4,789,575 | 12/1988 | Gibbons et al. | 428/34.2 |
| 4,835,025 | 5/1989 | Thompson et al. | 428/34.2 |
| 5,175,036 | 12/1992 | Smiley et al. | 428/36.7 |

*Primary Examiner*—James J. Bell
*Attorney, Agent, or Firm*—Michael J. Doyle, Esq.; Hoffman, Wasson and Gitler, P.C.

[57] ABSTRACT

A non-foil composite structure is provided having a substantial barrier to the loss of moisture, oxygen, and organic vapor and which is easily sealable with a shelf-life to at least one year for food and non-food products during dry shelf storage, and which is environmentally friendly. The laminate may have, from the outer atmosphere exposed surface to the inner surface contacting the contents of the container; a first exterior layer of a low density polyethylene polymer; a paperboard substrate; a first interior layer laminate coating of nylon with a tie layer; a second interior layer of low density polyethylene polymer; a third interior layer of high density polyethylene polymer; and an innermost and product contacting layer of low density polyethylene polymer.

21 Claims, 2 Drawing Sheets

NON-FOIL POLYMER COATED CARTON FOR PACKAGING FOOD AND NON-FOOD PRODUCTS

BACKGROUND OF THE INVENTION

1. Field of the Invention

The present invention relates to a non-foil polymer coated carton for packaging food and non-food products. More particularly, the present invention relates to a carton or laminate which is comprised of an improved heat-sealable non-foil composite structure which maintains a long shelf-life.

2. Description of the Prior Art

Loss of moisture is a primary factor limiting the shelf-life of packaged goods, including both food and non-food products. Such moisture loss is especially limiting for a shelf-life longer than one year dry shelf-life storage. At present, such products are packaged in glass jars, metal cans, or foil laminate constructions.

Heat-sealable low-density polyethylenes are well known to be components of current paperboard cartons. Additionally it is well known that impermeable materials such as aluminum foil, polar materials such as: polyamides, polyethylene terephthalates, polyvinylidene chlorides, polyvinyl chlorides, etc., and highly crystalline non-polar materials such as high-density polyethylene and polypropylene provide varying degrees or barriers to the absorption and/or transmission of moisture.

An existing commercial structure for a food beverage paperboard carton utilized an easily heat-sealable barrier laminate composed of paperboard sandwiched between two layers of low density polyethylene (LDPE). The LDPE is an inexpensive heat-sealable moisture barrier. However, the conventional structure falters in that the thick LDPE layer absorbs the essential oils after short periods of time causing integrity decay of heat seals, stress cracking of the layer, and allows the transmission of the essential oils into the paperboard and to the atmosphere. Additionally, the conventional structure provides virtually no barrier resistance to oxygen.

Another conventional structure adds two additional layers to the structure identified above, namely a foil layer and an additional LDPE layer. The expensive foil layer increases the barrier resistance to the flow of oxygen, while the additional LDPE layer allows for heat-sealability of the laminate. However, the foregoing construction still has poor barrier properties relating to the absorption of essential oils and aromas, since the interior contacting layer is a thick layer of LDPE.

The use of foil in the constructions for the storage of both food and non-food products has other drawbacks. The cost of such constructions is significant, both because of the cost of the material and for the labor to work the material to a useable state. The labor requires the metal foil to be worked to a point where a thin web of foil is created. The machinery, time and man hours for such an operation raises the price of the end product considerably. Furthermore, the material costs of aluminum are relatively high and are subject to large price fluctuations, making the projection of costs very difficult for long running production.

In recent years recycling and the reuse of manufactured products has become a major concern as awareness has grown of the negative effect of manufacturing and its byproducts can have on the environment. Constructions containing metal foil must have the metal foil removed prior to any further recycling effort in order to achieve a reusable product and to prevent damage to the environment. The only non-foil moisture barrier materials previously available for packaging are the expensive laminate film of Saranex or silicon monoxide polymer (SiOx). Both of these films have environmental disposal or recycling concerns.

In addition, foil in the packaging can interfere with other processes. For example, some food and non-food products must be analyzed for the presence of metal particles. The existence of foil in the packaging interferes with such metal detection. If a product is to undergo microwave treatment while in the original packaging, the presence of foil can be hazardous to the user and can damage the microwave oven.

Consequently, from the foregoing there is a need for a non-foil paperboard construction that provides containment and an adequate moisture barrier for longer shelf-life at ambient temperature storage, and overcomes the drawbacks of foil packaging.

An object of the present invention is to provide a cost effective extrusion/coextrusion coated or film laminated to non-foil paperboard structures that are environmentally friendly and can be converted in paperboard packages for specific product markets. Furthermore, it is an object of the present invention to provide structures having the necessary barrier properties, including moisture, oxygen, and organic vapor, and sealability to achieve up to one year of shelf-life for selected food and non-food products during dry shelf-storage.

SUMMARY OF THE INVENTION

These and other deficiencies are addressed by the present invention which is directed to a non-foil composite structure providing a substantial barrier to the loss of moisture, oxygen, and organic vapor and which is easily sealable with a shelf-life to at least one year for selected food and non-food products during dry shelf storage, and which is environmentally friendly. Additional layers may be added to create a more substantial oxygen barrier. The preferred embodiment comprises from the outer atmosphere exposed surface to the inner surface contacting the contents of the container: a first exterior layer of a low density polyethylene polymer; a paperboard substrate; a first interior layer laminate coating of nylon with tie layer; a second interior layer of low density polyethylene polymer; a third interior layer of high density polyethylene polymer; and an innermost and product contacting layer of low density polyethylene polymer.

A second embodiment of the present invention has a non-foil composite structure which comprises: from the outer atmosphere exposed surface to the inner surface contacting the contents of the container: a first exterior layer of a low density polyethylene polymer; a paperboard substrate; a first interior layer laminate coating of nylon with tie layer; a second interior layer of high density polyethylene polymer; a third interior layer of low density polyethylene polymer; and an innermost and product contacting layer of high density polyethylene polymer.

Cartons constructed of the laminate of the present invention produce improved barrier properties, including moisture, oxygen, and organic vapor resistance, and improved sealability, resulting in a substantial extension of the shelf-life for selected food and non-food products during dry shelf-storage to at least one year, and eliminates the need for aluminum foil.

BRIEF DESCRIPTION OF THE DRAWINGS

These and other attributes of the present invention will be described with respect to the following drawings in which.

DETAILED DESCRIPTION OF THE INVENTION

Figure 1:
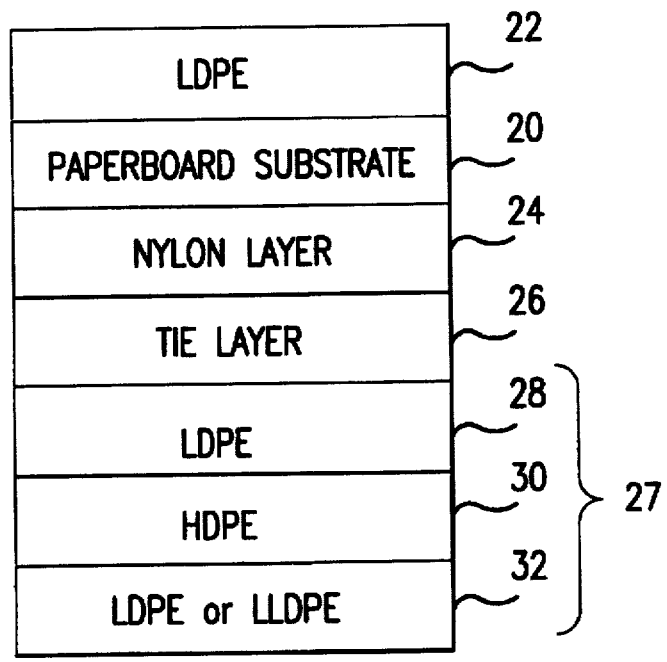
FIG. 1 is a cross-sectional elevation of a preferred embodiment of the present invention.

Referring to FIG. 1, the preferred embodiment of the laminate of the present invention is shown as comprising a paperboard substrate 20 of varying thickness which is most suitably high-grade paperboard stock, for example, 265 lb./3000 Sq. ft. ream half-gallon basestock, to which is applied on one side a coating of low density polyethylene polymer (LDPE) 22, in a coating weight on the order of 12 pounds per 3000 square foot. Any commercial extrusion coating grade LDPE is suitable for use herein. On the back or interior portion of the laminate, namely onto the paperboard layer 20, is a layer of nylon 24 having a coating weight on the order of 18 pounds per 3000 square foot, and a layer 26 of tie material, (such as tie material coatings marketed under the trademark TYMOR, or more specifically, TYMOR 1205 having a coating weight on the order of 4 pounds per 3000 square foot ream. The tie material coating marketed under the registered trademark of TYMOR 1205 is comprised of: a polyethylene backbone polymer with functional groups grafted thereon, such as maleic anhydride copolymer. On the interior of tie layer 26 is a sandwich layer 27 including a coating of low density polyethylene polymer (LDPE) 28, in a coating weight on the order of 3 pounds per 3000 square foot ream, a coating of high density polyethylene polymer (HDPE) 30, in a coating weight on the order of 22 pounds per 3000 square foot ream, and a second innermost coating of low density polyethylene polymer (LDPE) 32, in a coating weight on the order of 3 pounds per 3000 square foot ream.

Figure 2:
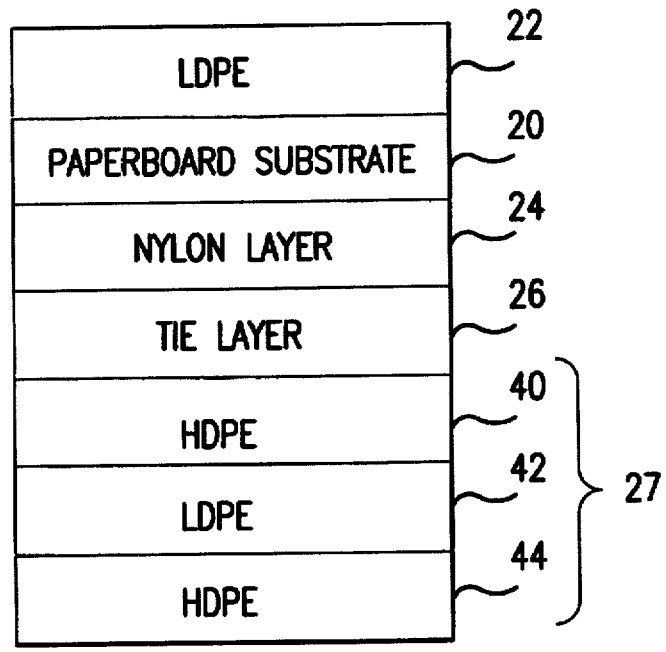
FIG. 2 is a cross-sectional elevation of a second embodiment of the present invention.

Referring to FIG. 2, a second embodiment of the laminate of the present invention is illustrated as comprising paperboard substrate 20, to which is applied on one side coating 22 of LDPE. Applied onto the paperboard layer 20, is layer 24 of nylon, and layer 26 of tie material (Tymor). On the interior of tie layer 26 is a sandwich layer 27 including a coating of high density polyethylene polymer (HDPE) 40, in a coating weight on the order of 11 pounds per 3000 square foot ream, a coating of LDPE 42, in a coating weight on the order of 6 pounds per 3000 square foot ream, and a second innermost coating of HDPE 44, in a coating weight on the order of 11 pounds per 3000 square foot ream.

The layers of LDPE 28, HDPE 30 and LDPE 32, of the first embodiment may be extruded separately or as a coextrusion. The innermost layer 32 may be made of LLDPE instead of LDPE.

Figure 3:
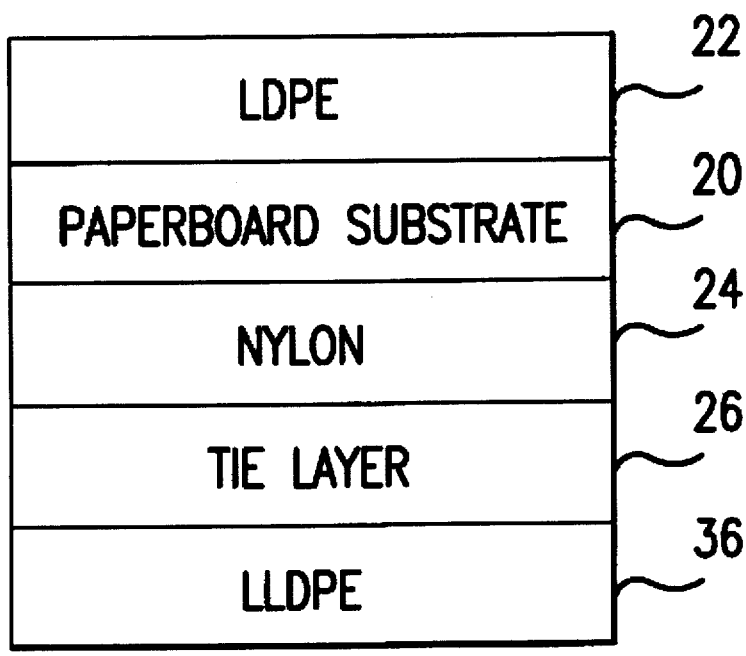
FIG. 3 is a cross-sectional elevation of a third embodiment of the present invention.

Referring to FIG. 3, a third embodiment is illustrated and includes a paperboard substrate 20 with a coating 22 of LDPE on one side of the paperboard substrate 20. A layer 24 of nylon is applied to a second side of the paperboard substrate 20 opposite the coating 22 of LDPE. Layer 26 of tie material is applied to the nylon layer 24. An innermost layer 36 of LLDPE is coated on the tie layer 26.

For non-food applications, containers made according to the present invention have a water vapor barrier with a water vapor transmission rate (WVTR) of at least 0.1 to 0.2 grams per 100 square inches per day (assuming 100% relative humidity (RH) and 100 degrees F.) and can successfully contain fabric softener and other detergents for at least twelve months dry shelf storage. The laminate may have additional flavor barriers (nylon, or ethylene vinyl alcohol copolymer (EVOH)) and/or oxygen barriers (EVOH). The construction of the laminate of the present invention has the additional advantage that it has adequate sealability for hot-filled products, namely the ability to withstand hot-fill temperatures above 200 degrees F., and suffers no heat pinhole damage due to heat sealing.

The barrier polymer coating weights are determined by barrier transmission rate testing and by shelf-life testing. The structure can be individually tailored to specific products and shelf-life storage conditions. The embodiments of the present invention achieve at least twelve months dry shelf-life storage, can contain aggressive products, provide adequate moisture barrier, provide adequate organic vapor (odor) and oxygen barrier for specific products, and have adequate sealability. It can be seen that the present invention provides a non-foil laminate which is environmentally friendly.

Having described the laminates in accordance with the present invention, it is believed that other modifications, variations and changes will be suggested to those skilled in the art in view of the description set forth above. It is therefore to be understood that all such variations, modifications and changes are believed to fall within the scope of the invention as defined in the appended claims.

What is claimed is:

1. A laminated packaging material comprising:

a paperboard substrate, having an inner surface and an outer surface;

an outer layer of heat-sealable low density polyethylene polymer coated on said outer surface of said paperboard substrate;

a nylon layer coated on said inner surface of said paperboard substrate;

a tie layer coated on an inner surface of said nylon layer;

a sandwich layer comprising a layer of low density polyethylene polymer, a layer of high density polyethylene polymer, and an innermost layer of low density polyethylene polymer, said sandwich layer being coated on an inner surface of said tie layer.

2. A laminate as recited in claim 1, wherein said outer layer of heat-sealable low density polyethylene polymer is a 12 lb. layer per 3000 square foot ream.

3. A laminate as recited in claim 1, wherein said layers of low density polyethylene polymer of said sandwich layer are 3 lb. layers per 3000 square foot ream.

4. A laminate as recited in claim 1, wherein said layer high density polyethylene polymer is a 22 lb. layer per 3000 square foot ream.

5. A laminate as recited in claim 3, wherein said layer high density polyethylene polymer is a 22 lb. layer per 3000 square foot ream.

6. A laminate as recited in claim 1, wherein said tie layer is a 4 lb. layer per 3000 square foot ream.

7. A laminate as recited in claim 1, wherein said nylon layer is an 18 lb. layer per 3000 square foot ream.

8. A laminate as recited in claim 1, wherein said tie layer comprises a polyethylene backbone polymer with functional groups grafted thereon.

9. A laminated packaging material comprising:

a paperboard substrate, having an inner surface and an outer surface;

a 12 lb. per 3000 square foot ream outer layer of heat-sealable low density polyethylene polymer coated on said outer surface of said paperboard substrate;

a 18 lb. per 3000 square foot ream nylon layer coated on said inner surface of said paperboard substrate;

a 4 lb. tie layer coated on an inner surface of said nylon layer;

a sandwich layer comprising a 3 lb. layer of low density polyethylene polymer, a 22 lb. per 3000 square foot ream layer of high density polyethylene polymer, and an innermost 3 lb. per 3000 square foot ream layer of low density polyethylene polymer coated on an inner surface of said tie layer.

10. A laminate as recited in claim 9, wherein said paperboard substrate is an approximately 265 lb. layer per 3000 square foot ream.

11. A laminated packaging material comprising:

a paperboard substrate, having an inner surface and an outer surface;

an outer layer of heat-sealable low density polyethylene polymer coated on said outer surface of said paperboard substrate;

a nylon layer coated on said inner surface of said paperboard substrate;

a tie layer coated on an inner surface of said nylon layer;

a sandwich layer comprising a layer of high density polyethylene polymer, a layer of low density polyethylene polymer, and an innermost layer of high density polyethylene polymer, said sandwich layer being coated on an inner surface of said tie layer.

12. A laminate as recited in claim 11, wherein said outer layer of heat-sealable low density polyethylene polymer is a 12 lb. per 3000 square foot ream layer.

13. A laminate as recited in claim 11, wherein said layers of high density polyethylene polymer of said sandwich layer are 11 lb. per 3000 square foot ream layers.

14. A laminate as recited in claim 11, wherein said layer of low density polyethylene polymer is a 6 lb. per 3000 square foot ream layer.

15. A laminate as recited in claim 13, wherein said layer of high density polyethylene polymer is a 22 lb. per 3000 square foot ream layer.

16. A laminate as recited in claim 11, wherein said tie layer is a 4 lb. per 3000 square foot ream layer.

17. A laminate as recited in claim 11, wherein said nylon layer is a 18 lb. per 3000 square foot ream layer.

18. A laminate as recited in claim 11, wherein said tie layer comprises a polyethylene backbone polymer with functional groups grafted thereon.

19. A laminate as recited in claim 11, wherein said paperboard substrate is an approximately 265 lb. per 3000 square foot ream layer.

20. A laminated packaging material comprising:

a paperboard substrate, having an inner surface and an outer surface;

a 12 lb. per 3000 square foot ream outer layer of heat-sealable low density polyethylene polymer coated on said outer surface of said paperboard substrate;

a 18 lb. per 3000 square foot ream nylon layer coated on said inner surface of said paperboard substrate;

a 4 lb. per 3000 square foot ream tie layer coated on an inner surface of said nylon layer;

a sandwich layer comprising an 11 lb. per 3000 square foot ream layer of high density polyethylene polymer, a 6 lb. per 3000 square foot ream layer of low density polyethylene polymer, and an 11 lb. per 3000 square foot ream innermost layer of high density polyethylene polymer, said sandwich layer being coated on an inner surface of said tie layer.

21. A laminated packaging material comprising:

a paperboard substrate, having an inner surface and an outer surface;

an outer layer of heat-sealable low density polyethylene polymer coated on said outer surface of said paperboard substrate;

a nylon layer coated on said inner surface of said paperboard substrate;

a tie layer coated on an inner surface of said nylon layer; and a layer of linear low density polyethylene on an inner surface of said tie layer.

* * * * *